US00RE35393E

United States Patent [19]

Mohrman

[11] E Patent Number: Re. 35,393

[45] Reissued Date of Patent: Dec. 10, 1996

[54] MULTI-PURPOSE ATTACHMENTS FOR POWER LAWN MOWER BLADES

[76] Inventor: John H. Mohrman, 301 Village Rd., Orwigsburg, Pa. 17961

[21] Appl. No.: 301,065

[22] Filed: Sep. 6, 1994

Related U.S. Patent Documents

Reissue of:

[64] Patent No.: 5,163,276
Issued: Nov. 17, 1992
Appl. No.: 766,085
Filed: Sep. 27, 1991

[51] Int. Cl.[6] ..... A01D 55/00

[52] U.S. Cl. ..... 56/255; 56/295

[58] Field of Search ..... 56/229, 231, 249, 56/255, 256, 264, 289, 294, 295

[56] References Cited

U.S. PATENT DOCUMENTS

| | | | |
|---|---|---|---|
| 3,430,424 | 3/1969 | Hasenbank | 56/255 |
| 3,538,692 | 11/1970 | Cope et al. | 56/295 |
| 3,724,182 | 4/1973 | Long et al. | 56/255 X |
| 4,715,173 | 12/1987 | Anderson | 56/295 |
| 4,936,884 | 6/1990 | Campbell | 56/255 X |

*Primary Examiner*—Michael Powell Buiz
*Attorney, Agent, or Firm*—Arthur R. Eglington

[57] ABSTRACT

The multi-purpose attachments for power lawn mower blades are designed to increase the efficiency and usefulness of the mower both to cut lawns and blow snow, leaves or debris from areas. The serrated cutter attachments allow replacement with ease, have longer lasting sharpness and the cutting surface is protected from foreign objects. In addition, the serrated cutters may be manufactured economically enough to allow used cutter attachments to be discarded. The blower attachments are designed to create adequate air pressure to remove snow, leaves and debris from select areas. The blower attachments are also designed to be resilient to assure safe use if foreign objects are struck during such use.

7 Claims, 2 Drawing Sheets

MULTI-PURPOSE ATTACHMENTS FOR POWER LAWN MOWER BLADES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to devices that are attachable to existing type blades or a new flat type blade for use on a rotary power lawn mower to cause the power mower to become more effective for the purpose for which it was designed and to equip the horizontal directional blades of such equipment with devices so as to cause that equipment to perform additional functions.

2. Brief Description of the Prior Art

Heretofore, power lawn mower horizontal directional cutting blades were used as single units with a horizontal cutting edge at each end and with a portion of the blade bent at each end to serve as an air foil in causing cut material to lift within the mower housing and be thrown out of the discharge opening. The cutting ability of those single blades rapidly deteriorated from a sharpened state to a dull state wherein lawn material was torn rather than cut as a blade was continued in use. The alternative to prevent such tearing action was to either replace the blade or sharpen the blade frequently.

When the cutting portion of the conventional blades comes in contact with pieces of hard material or stones, the efficiency of that cutting edge is materially lessened and the remaining portion of the cutting edge becomes less effective as the mower is used in a normal manner.

The current blade cutting edges are very limited in the length of time they can be used prior to replacement or sharpening. Such condition causes inconvenience on the part of the user and becomes expensive in replacing or sharpening such cutting edged blades.

Further continuous use of dull cutting edged blades is destructive in the care and maintenance of lawns and is a contributing factor to reducing the efficiency of the motor or engine powering the blade. Use of excessive power to drive the dull blades reduces the serviceable life-expectancy of the motor or engine providing such power.

Moreover, use of power lawn mowers was solely restricted to cutting grass and other individual tools or equipment were required for snow removal and clearing leaves or other debris from particular areas. As a result, seasonal maintenance of grounds, walks and driveways has generated requirements to acquire and care and maintain an extensive and expensive array of multiple items of power equipment.

Official disclosure of the serrated rotary lawn mower blade cutter attachments was made to the U.S. Patent and Trademark Office in DISCLOSURE No. 285978.

No known patent has been granted prior to this application on the novelty and patentability of the invention described herein.

SUMMARY OF THE INVENTION

The present invention provides attachments for mounting on existing rotary power mower blades or new flat blades that will cause the powering equipment to be considered for multi-purpose use in the future. Because of the multi-purpose capability of the powering equipment such equipment can be used in any season rather than only in the lawn cutting season. Use of the attachments will not only increase the efficiency of the lawn cutting capability but will also allow use of the equipment as a snow blower and a blower to remove leaves, cut grass or other debris from areas. The sharp multiple concavity design of the serrated lawn cutting attachments are capable of cutting lawns more evenly and efficiently and remaining sharper for longer periods of time than the present blades. In addition the serrated cutters do not require mechanical skill beyond threading a nut on a bolt to attach or detach from the blade. Depending on various methods of manufacture and materials used, it is feasible that the serrated cutters may be economical enough to replace with new sharp cutters and simply discard the used cutters. Far less effort and cost would be involved in that procedure than is now required to either replace or remove and sharpen present blades. The blade attachment to convert the rotary power unit into a blower for removal of snow, leaves, cut grass and other debris also attaches to the blades in the same manner as the serrated cutters. That attachment creates maximum air movement required to blow material described herein above, from normally smooth surfaces. The attachment depth is determined by using depth mounting plates as necessary. A diagonally mounted air pressure plate is caused to travel above the surface being cleared by the pilot wheel attached to that plate. In addition the plate is hinged and spring loaded in order to insure that the attachment will pass over any obstructions without causing damage to the equipment or endangering the person operating the equipment.

From the foregoing general description of the invention, it will become apparent that it is an important object of the present invention to provide attachments for the horizontal directional blades of powered rotary lawn mowers to allow that equipment to be used for multi-purposes.

Another object of the invention is to provide serrated replaceable cutters for power lawn mower blades that can be readily installed on present shaped air-foil type blades or on newly manufactured flat type blades.

A further object of the invention is to provide a cutting edge for power mower blades that has more cutting edge surface.

A further object of the invention is to provide a cutting edge for power mower blades that consists of a multiplicity of sharpened concave shaped spaces that cause the material to be cut to be collected and cut with a slicing motion thereby insuring that no tearing action exists.

A further object of the invention is to provide a cutting edge that will not become inefficient when the cutting edge strikes hard objects because said hard objects can only contact the protruding parts of the serrated edge or the end of the cutter leaving the recessed areas capable of efficient cutting of the material.

A further object of the invention is that the serrated cutters provide an angular air-foil to immediately lift cut material thereby increasing the efficiency of the mower to discharge cut material.

Another object of the invention is to provide a attachment for the rotary power mower blade which will allow the machine to be used to blow snow, leaves and debris off of desired areas. Such attachment to contain a spring loaded hinged air blower capable of removing the material described herein above and having the capability to prevent damage to the surface on which it is used. Further, that the attachment can be installed at a specific height by use of spacing washers. Still, another object of the invention is the ease of installation or removal of the attachments compared to time, effort and cost required to insure that present type mower blades are balanced and properly installed. Balancing of the attachments on the blade(s) can readily be accomplished by the addition of washers to the attaching bolts.

Finally, installing the attachments on either the present type or a new flat blade can be accomplished by use of a machine bolt with lock washer through threading in the cutter or by using a carriage bolt and nut with washers with the bolt head under the cutter. Placement of bolts and types used will prevent cutting material from being picked up by the bolt heads.

Further objects and advantages of the invention will be apparent upon reading the following description of a physical embodiment of the invention illustrated in the accompanying drawings which illustrate the invention.

DETAILED DESCRIPTION OF THE PREFERRED EMBODIMENT OF THE INVENTION

Referring initially to FIGS. 1, 2, 3, and 4 of the drawings, the serrated attachment to the rotary mower blade is shown in various applications.

Figure 1:
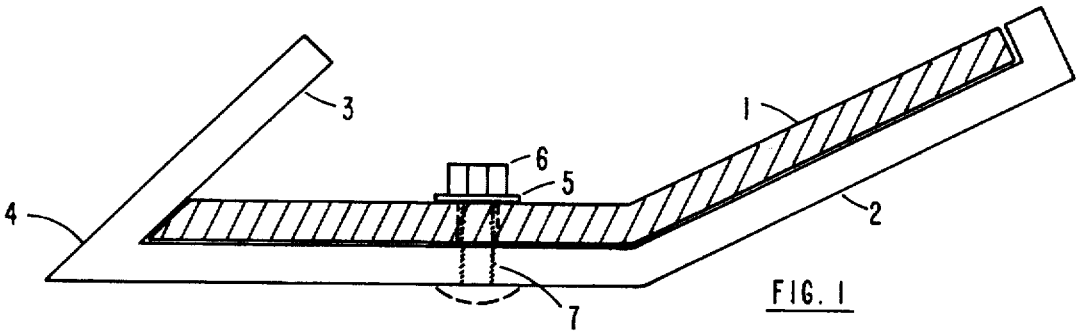
FIG. 1 is a cut sectional view of the side of the serrated cutter attached to a conventional type mower blade by a machine bolt with threading in the cutter.
Figure 2:
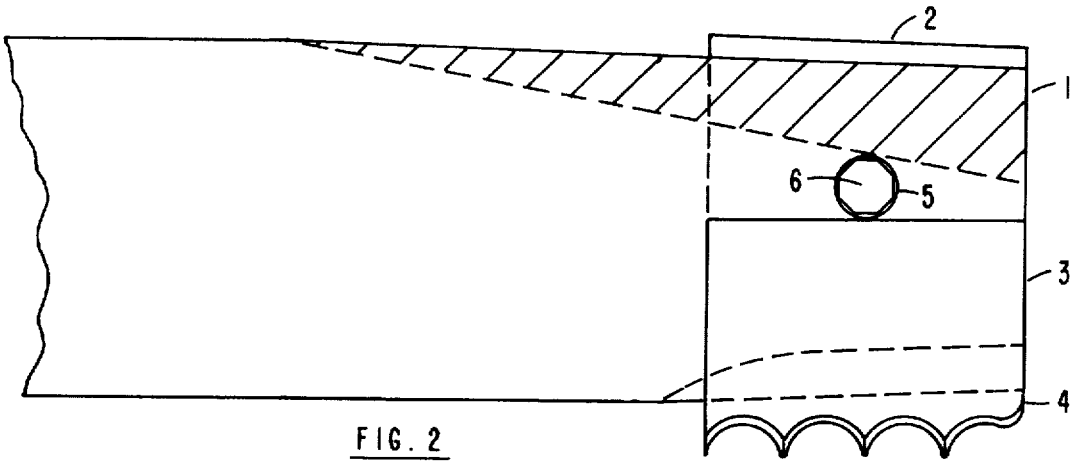
FIG. 2 is a sectional view of the top of the mower blade and cutter attachment with the cutter in position on a conventional blade.

The serrated attachment is shown mounted on a conventional mower blade in FIGS. 1 and 2. 1 represents the contour of a conventional blade while 2 indicates the attached serrated cutter. The air foil is shown as 3 while the multiple concave sharpened serrated cutting areas are shown as 4. 5 shows the washers for the carriage bolt 7 and nut 6 fastening the attachment to the blade 1.

Figure 3:
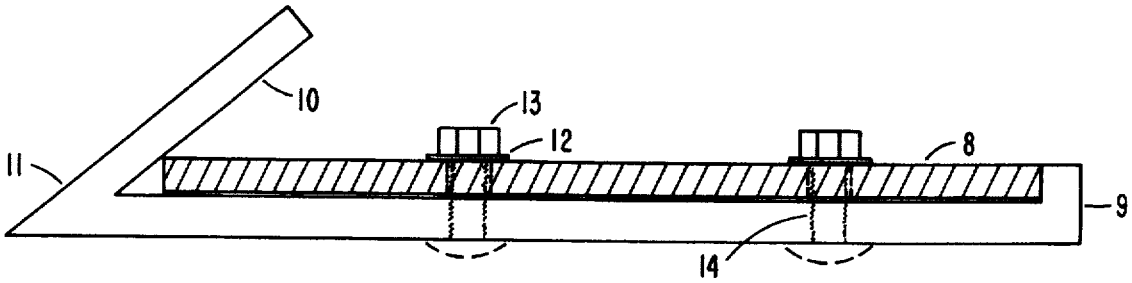
FIG. 3 is a cut sectional view of the side of the serrated cutter attached to a flat blade without manufactured cutting edge by use of a carriage bolt(s) with nut and washers or by use of a machine bolt with threading in the cutter.
Figure 4:
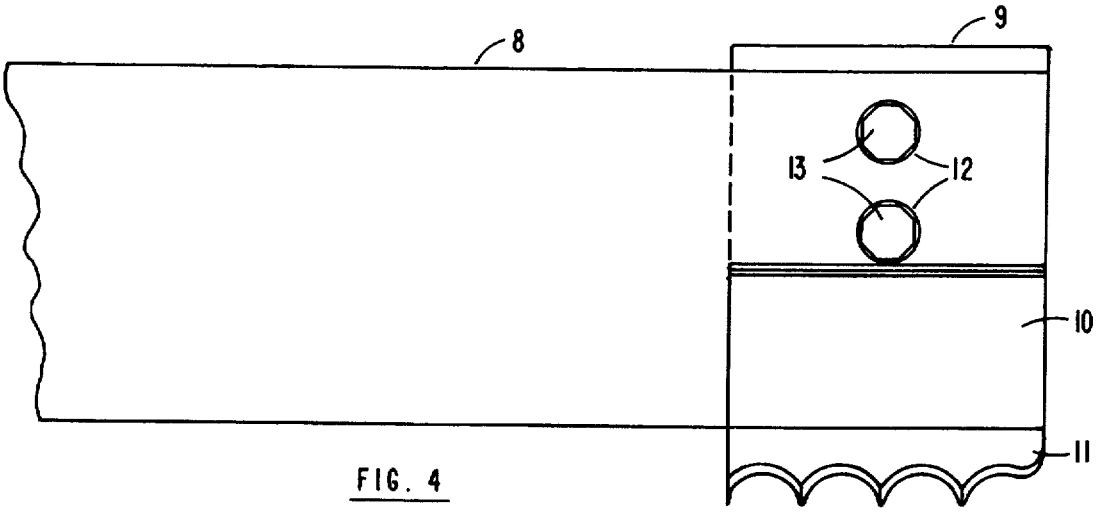
FIG. 4 is a cut sectional view of the top of the mower blade showing the serrated cutter attached to a flat blade.
Figure 5:
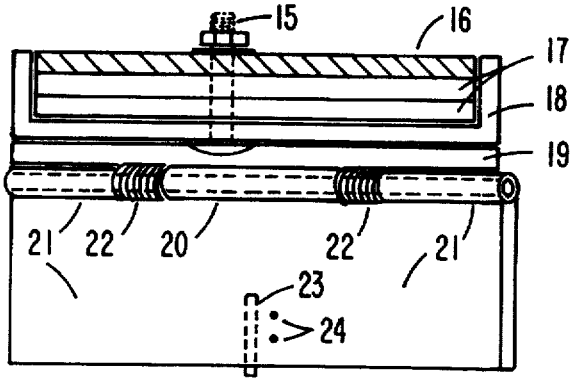
FIG. 5 is a sectional view of the front of the blower attachment.

Referring to FIGS. 3 and 4, the attachment is shown as being mounted on a flat type rotary mower blade. The flat blade is shown as 8 and the attachment is shown as 9. The air foil in the attached serrated cutter is shown as 10 and the multiple concave sharpened serrated cutting areas are shown as 11. 12 are the washers for carriage bolts 14, fastened with nuts 13.

Figure 8:
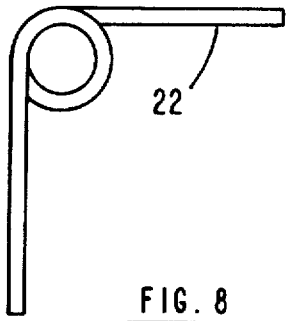
FIG. 8 is an enlarged view of the L-spring used to tension the blower attachment blade.
Figure 6:
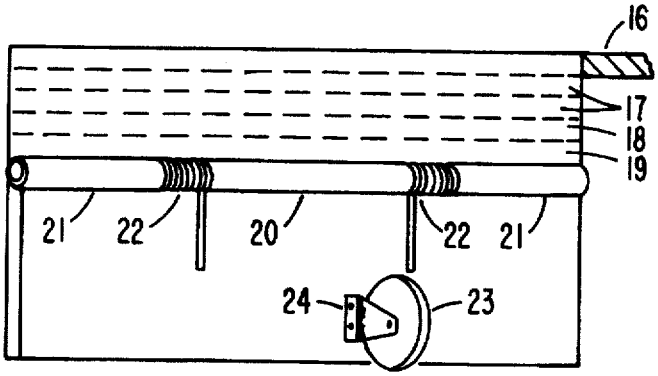
FIG. 6 is a sectional view of the back of the blower attachment.
Figure 9:
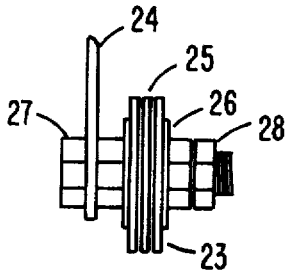
FIG. 9 is a sectional detailed view of the spacing wheel that maintains a set distance between the blower attachment blade and the surface being cleared.
Figure 7:
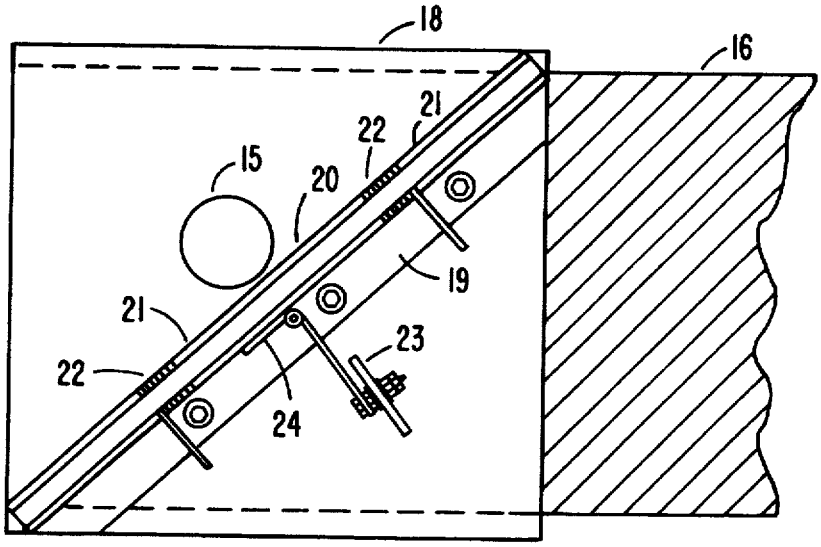
FIG. 7 is a sectional bottom view of the blower attachment.

FIGS. 5, 6, 7, 8 and 9 shown the various positions plus details of the blower attachment with 15 representing the carriage bolt, nut and washers used to attach the assembly. 16 shows the flat type mower blade while 17 shows the spacing bars. 18 is the blower attachment base that attaches to the mower blade and 19 is the section of the hinged subassembly of the blower plate attached the base of the assembly with nuts, bolts and washers. 20 is the hinge portion with hinge pin that is in a fixed position while 21 shows the hinged portions of the blower plate traversing the hinge pin. 22 are L-shaped springs mounted on the hinge pin to allow the blower plate 21 to retract as necessary. FIG. 8 shows the enlarged L-shaped spring 22. 23 is a pilot wheel also shown in detail in FIG. 9 which attaches to the back of the blower plate on bracket 25. The pilot wheel subassembly as shown in FIG. 9 and referred to as 23 consists of multiple circular wheels 25 rotating on a bolt axle between washers 26 which is attached to bracket 24 by machine bolt 27 and locked in place on the bolt axle with multiple nuts 28.

What is claimed is:

[1. Attachments for the horizontal directional blade of a powered rotary lawn mower that will allow multi-purpose use of the power equipment comprising in combination:

a serrated cutting assembly that will attach either to current sharp edged air foil shaped ended blades or flat ended blades, having a means of attachment to the blade and being shaped with an serrated cutting edge formed as part of a front air foil and fashioned to align with the blade end shape and having a vertical stop formed at the rear;

such cutting edge being formed of a sharpened multiplicity of concave areas to form the serrated cutting edge and such cutting surfaces being protected by the protruding points of the serration from dulling when in contact with hard objects;

a blower assembly having a means of attachment to the blade, said assembly consisting of a hinged spring tensioned blower plate, a fixed horizontal hinge plate with pin, a U-shaped base supporting and attached to the fixed horizontal hinge, height adjustment plates and a pilot wheel to control the proximity of the lower blower plate edge to the surface beneath; and such blower plate being mounted in an angular position to effect maximum air movement during rotation motion and being tensioned with the L-shaped springs to allow movement of said plate when in contact with any foreign object resting on the surface beneath.]

*2. An accessory cutting assembly for mounting and use with a rotary linear bar normally adapted to serve as a mowing and/or trimming device by virtue of a pair of cutting edges incorporated into the opposing leading edges of said bar, wherein said planar bar is centrally mounted on a powered output shaft adapted to rotate about a vertical axis of rotation, the accessory assembling including:*

*(a) a rigid formed component having two essentially rectangular planar elements being conjoined along their longer dimension at an acute angle to present a V-shaped vertical cross section defining both external and an internal linear edges;*

*(b) the external linear edge of the V-shaped conjuncture of said component is provided with adjacent multiple concave cutting edges extending along substantially all of its external linear edge;*

*(c) a first of the planar elements having a shorter transverse dimension and being positioned to enfold the*

*planar bar normal cutting edge, and its open linear dimension being oriented toward the trailing edge of said cutting bar which provides same with an angular airfoil effect;*

*(d) the second of the planar elements having a larger and elongate transverse dimension adapted to closely overlay the undersurface of the planar cutting bar; and*

*(e) at least one borehole positioned centrally of the transverse dimension of the second planar element positioned to align itself with a normally existing perforation in the outer section of the planar bar providing a common passageway for securing one to the other fixedly during cutter bar operation.*

*3. The accessory assembly of claim 2 in which the transverse dimension of the second planar element is adapted to closely overlap the external surface of the dual planar cutter bar, which bar is provided with an air foil configuration when seen in vertical cross section.*

*4. The accessory assembly of claim 2 in which the transverse dimension of the second planar element is adapted to closely overlap a generally planar external cutter bar surface which bar is provided with an uninterrupted linear vertical cross section.*

*5. The accessory assembly of claim 2 in which the serrated linear edge of the V-shaped conjuncture is provided with a beveled outer corner.*

*6. The accessory assembly of claim 2 in which the overlapping outer surface of the cutter bar and the second planar element are maintained secured by a machine bolt, washer and lock nut combination with the bolt head oriented to project from the undersurface of said planar element to minimize cutting material pickup.*

*7. The accessory assembly of claim 2 in which the second planar element along its trailing linear edge is provided with an upward flange adapted to enclose the trailing linear edge of said planar bar.*

*8. The accessory assembly of claim 2 in which the serrated linear edge of the V-shaped conjuncture is provided with protruding parts leaving the recessed concave areas capable of efficient cutting.*

* * * * *